United States Patent
Hecht

(10) Patent No.: US 11,501,271 B1
(45) Date of Patent: Nov. 15, 2022

(54) SYSTEM AND METHOD FOR MOBILE CHECK DEPOSIT WITH RESTRICTED ENDORSEMENT

(71) Applicant: Wells Fargo Bank, N.A., San Francisco, CA (US)

(72) Inventor: Al Hecht, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/102,306

(22) Filed: Nov. 23, 2020

Related U.S. Application Data

(63) Continuation of application No. 14/496,480, filed on Sep. 25, 2014, now Pat. No. 10,846,667.

(60) Provisional application No. 61/885,463, filed on Oct. 1, 2013.

(51) Int. Cl.
 G06Q 20/10 (2012.01)
 G06Q 20/04 (2012.01)
 G06Q 20/40 (2012.01)
 G06Q 20/32 (2012.01)

(52) U.S. Cl.
 CPC ......... *G06Q 20/108* (2013.01); *G06Q 20/042* (2013.01); *G06Q 20/322* (2013.01); *G06Q 20/4016* (2013.01)

(58) Field of Classification Search
 CPC .. G06Q 20/108; G06Q 20/042; G06Q 20/322; G06Q 20/4016
 See application file for complete search history.

(56) References Cited

U.S. PATENT DOCUMENTS

| | | | |
|---|---|---|---|
| 5,917,965 A * | 6/1999 | Cahill | G06Q 40/02 382/305 |
| 6,453,079 B1 | 9/2002 | McInerny | |
| 7,379,978 B2 | 5/2008 | Anderson et al. | |
| 7,752,286 B2 | 7/2010 | Anderson et al. | |
| 8,083,136 B1 * | 12/2011 | Brown | G07D 7/206 382/140 |
| 8,379,914 B2 | 2/2013 | Nepomniachtchi et al. | |

(Continued)

FOREIGN PATENT DOCUMENTS

| | | |
|---|---|---|
| CA | 2316090 A1 | 2/2001 |
| CA | 2753913 A1 | 5/2011 |

(Continued)

OTHER PUBLICATIONS

Seth F. Kreimer, "Pervasive Image Capture and the Fist Amendment: Memory, Dicourse, and the Right to Record," University of Pennsylvania Law Record, vol. 159, No. 2, pp. 335-410 (Jan. 2011). (Year: 2011).*

(Continued)

*Primary Examiner* — Virpi H Kanervo
(74) *Attorney, Agent, or Firm* — Foley & Lardner LLP

(57) ABSTRACT

A computer-implemented method includes receiving, from a mobile device, a deposit request including a first check image for funds to be deposited into a user account, determining a risk level associated with the deposit request, requesting a second check image having a restricted endorsement based on the risk level, receiving the second check image having the restricted endorsement, determining a confidence level based on the restricted endorsement, and transferring the funds to the user account based on the confidence level.

20 Claims, 4 Drawing Sheets

(56) References Cited

U.S. PATENT DOCUMENTS

| | | | |
|---|---|---|---|
| 8,392,332 B1 | 3/2013 | Oakes et al. | |
| 8,573,483 B1 | 11/2013 | Crews et al. | |
| 8,768,038 B1 * | 7/2014 | Sherman | G06T 1/0007 |
| | | | 382/140 |
| 8,959,033 B1 | 2/2015 | Oakes et al. | |
| 2005/0035193 A1 | 2/2005 | Gustin et al. | |
| 2005/0133587 A1 * | 6/2005 | Michelassi | G06Q 20/042 |
| | | | 235/379 |
| 2007/0122024 A1 | 5/2007 | Haas et al. | |
| 2007/0136198 A1 | 6/2007 | Foth et al. | |
| 2008/0021830 A1 | 1/2008 | Apergis | |
| 2008/0140579 A1 | 6/2008 | Sanjiv | |
| 2009/0171827 A1 | 7/2009 | Callahan et al. | |
| 2010/0268690 A1 | 10/2010 | Anderson et al. | |
| 2011/0128566 A1 | 6/2011 | Eum et al. | |
| 2011/0134248 A1 | 6/2011 | Heit et al. | |
| 2011/0228308 A1 | 9/2011 | Goldman et al. | |
| 2012/0008851 A1 | 1/2012 | Pennock et al. | |
| 2012/0029969 A1 | 2/2012 | Franke et al. | |
| 2013/0028502 A1 | 1/2013 | Nepomniachtchi et al. | |
| 2013/0085935 A1 | 4/2013 | Nepomniachtchi et al. | |
| 2013/0110724 A1 | 5/2013 | Edwards | |
| 2013/0204783 A1 | 8/2013 | Klose et al. | |
| 2013/0212008 A1 | 8/2013 | Edwards et al. | |
| 2014/0040248 A1 | 2/2014 | Walsham | |
| 2014/0067661 A1 | 3/2014 | Elischer | |

FOREIGN PATENT DOCUMENTS

| | | | | |
|---|---|---|---|---|
| CA | 2756913 A1 | 5/2012 | | |
| WO | WO-2005048151 A1 * | 5/2005 | | G06Q 20/4016 |

OTHER PUBLICATIONS

Furst et al., "Internet Banking: Developments and Prospects", Economic and Policy Analysis Working Paper Sep. 2000. (Sep. 2000).

Adam J. Levitin, "Remote Deposit Capture: A Legal and Transactional Overview," Banking Law Journal 126, No. 2 (Feb. 2009): 115-122. (Year: 2009).

* cited by examiner

SYSTEM AND METHOD FOR MOBILE CHECK DEPOSIT WITH RESTRICTED ENDORSEMENT

CROSS-REFERENCE TO RELATED PATENT APPLICATIONS

The present application is a continuation of U.S. patent application Ser. No. 14/496,480, filed Sep. 25, 2014 and titled "SYSTEM AND METHOD FOR MOBILE CHECK DEPOSIT WITH RESTRICTED ENDORSEMENT," now U.S. Pat. No. 10,846,667, which further claims priority under 35 U.S.C. §119(e) to U.S. Provisional Patent Application No. 61/885,463, filed on Oct. 1, 2013 and titled "SYSTEM AND METHOD FOR MOBILE CHECK DEPOSIT WITH RESTRICTED ENDORSEMENT," all of which are incorporated by reference in their entireties and for all purposes.

BACKGROUND

Mobile communication devices having a wireless internet connection, such as a cellular phone or a smart phone, may be used to deposit checks to a financial account held with a financial institution. The checks may be deposited through a website of the financial institution or via an application run by the mobile device. A check may be deposited by capturing one or more images of the check and sending the images remotely to the financial institution. The financial institution reviews the images and either accepts or rejects the deposit based on the images. If accepted by the financial institution, the financial institution may make the funds immediately available to the account holder. However, the check is retained by the account holder and remains free of any markings suggesting the check has been deposited. As such, the account holder may be able to cash the check with a check cashing service to again receive the value of the check. If the check cashing service has possession of the check (and thus priority) and the financial institution is unable to recover the funds distributed to the account holder (e.g., the financial account has a negative value), the financial institution may then lose the amount of the check.

SUMMARY OF THE DISCLOSURE

One embodiment relates to a computer-implemented method which includes receiving, from a mobile device, a deposit request including a first check image for funds to be deposited into a user account, determining a risk level associated with the deposit request, requesting a second check image having a restricted endorsement based on the risk level, receiving the second check image having the restricted endorsement, determining a confidence level based on the restricted endorsement, and transferring the funds to the user account based on the confidence level.

DETAILED DESCRIPTION

Figure 1:
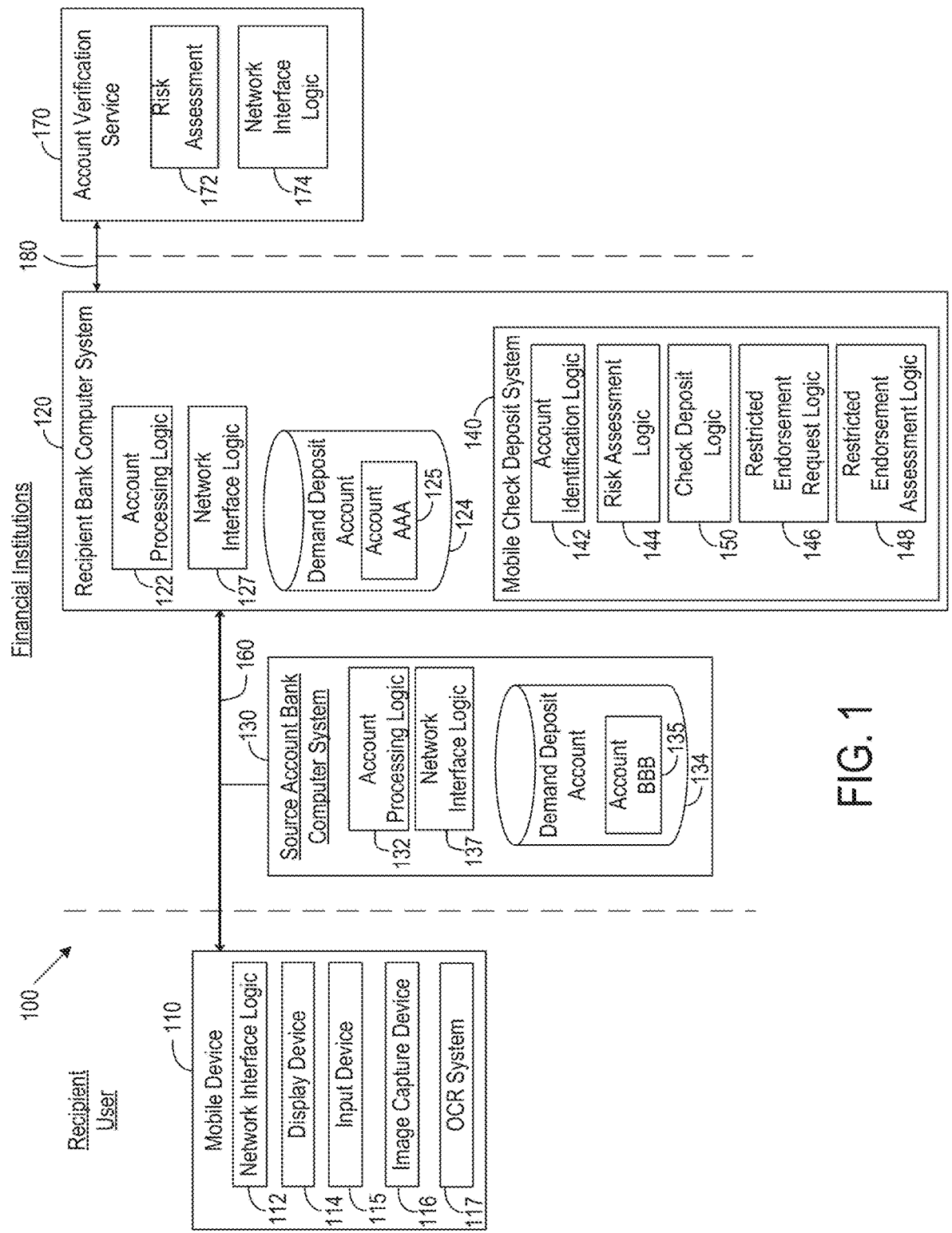
FIG. 1 is a schematic diagram of a computer-implemented check processing system, according to an exemplary embodiment.

Referring to FIG. 1, a computer-implemented check processing system 100 using a mobile device 110 is shown, according to an exemplary embodiment. The check processing system 100 may be utilized by a user of the mobile device 110 (e.g., an account holder, recipient user, etc.) to deposit checks to an account held by a financial institution. The user may be a business entity and/or an individual consumer that has one or more accounts with the financial institution. The mobile device 110 can be used to transmit check images and other user-provided data to a recipient bank computer system 120. Additionally, funds can be transferred from the source account bank to the recipient account bank. Alternatively, the source account and the recipient account can be held at a single financial institution. While, in the example of FIG. 1 a mobile device 110 is shown, as will be appreciated, the recipient may also use other devices (e.g., laptop or desktop computer system, not shown) to capture and transmit an image of a check to the financial institution.

The check processing system 100 may include, among other systems, the mobile device 110 (e.g., cellular phone, smart phone, tablet, mobile handheld wireless e-mail device, personal digital assistant, portable gaming device, tablet, laptop, camera, etc.), the recipient bank computer system 120, and a source account bank computer system 130. The mobile device 110, the recipient bank computer system 120, and the source account bank computer system 130 may communicate through a network 160, which may include one or more of a cellular network, a wireless local area network (WLAN), Wi-Fi, Wi-Max, a proprietary banking network, and so on. The network 160 may connect the mobile device 110 to the Internet, such as via a wireless network access point or other connection. The mobile device 110, the recipient bank computer system 120, and the source account bank computer system 130 may each comprise a computer system (e.g., one or more servers each with one or more processors) configured to execute instructions, send and receive data stored in memory, and perform other operations to implement the operations described herein associated with logic or processes shown in FIGS. 2-4.

The mobile device 110 can be configured to access resources provided by a financial institution using an application or a web browser with a connection to a communications network (e.g. the Internet). The financial institution may publish applications to the user mobile device 110 using various digital online marketplaces. The name or web address of the marketplace may depend on the operating system of the mobile device 110. The individuals may, for example, use the mobile device 110 to perform banking tasks such as making deposits. Examples of operating systems include iOS®, Windows Phone®, Symbian®, Android®, Blackberry®, WebOs®, and so on.

The mobile device 110 may allow a recipient of a check to deposit the funds from the check writer's account to a financial institution account owned by the recipient. The mobile device 110 may send information that is on the check to the financial institution to receive funds from the check writer's account. Although in the illustrated embodiment the mobile device 110 is used to deposit a check using a financial institution application, it will be appreciated that the mobile device may deposit a check using different mechanisms, for example, through an online banking area of a web site of the banking institution that allows a user to upload the image of the check.

The mobile device 110 may be used by an individual user (e.g., a business owner or employee, a consumer, and so on) to deposit funds to an account. The mobile device 110 comprises a network interface logic 112, display device 114, input device 115, image capture device 116, and OCR system 117. Network interface logic 112 may include, for example, program logic that connects the mobile device 110 to the network 160. As described in greater detail below, for example, the mobile device 110 may receive and display screens for mobile check deposit, account information, transaction instructions, and so on. In an example embodiment, such screens may be used to request authentication information (e.g. username and password). Such screens may also be used to prompt the user to provide additional information associated with the check, such as regarding the amount of the funds written on the check and which business or individual has paid the recipient by a check. Such screens may also be used to prompt the user to provide one or more images of the check, such as a check image including a restricted endorsement. Such screens are presented to the user via the display device 114. The input device 115 may be used to permit the user to initiate account access and to facilitate receiving requested information from the user. As will be appreciated, in addition to or instead of the mobile device 110, users may also be provided with the ability to access the check processing system 100 using another type of computer (e.g., a desktop or laptop computer executing browser software) to perform the operations described herein as being performed by the mobile device 110.

The display device 114 may be configured to generate images and a user interface for the user of the mobile device 110. For example, the display device 114 may prompt the user to enter the check information regarding a check deposit transaction. The display device 114 provides visual feedback to the user when the user attempts to use the image capture device 116 to capture an image of a check. In one example, the display device 114 may display guides over the image generated by the image capture device 116 to allow the user to frame the image of the check within a desired area of the screen. The display device 114 can be located on an opposing side of the mobile device 110 as the image capture device 116. The opposing orientation of the image capture device 116 compared to the display device allows a user to view the display device while the image capture device 116 is facing away from the user. In other mobile devices, the display device 114 can also be located on the same side of the mobile device 110 as the image capture device 116. Other mobile devices can include a plurality of image capture devices 116.

The image capture device 116 may comprise a camera, scanner or another suitable image capture device that is configured to capture the image of a check. The image capture device 116 can include one or more lenses and an image sensor configured to record the images on the memory system of the mobile device 110. The image capture device 116 can be integrated into the body of the mobile device 110. The image capture device 116 may be configured to capture an image of a written instrument such as a check, cashier's check, bank check or other types of negotiable instrument. The mobile device 110 transmits the image to a financial institution computer system (e.g., recipient bank computer system 120).

Upon receiving the image of the check captured by the image capture device 116, the mobile device 110 may request that the OCR system 117 determine the location of characters such as text within the check image. The OCR system 117 can be an application stored on the mobile device 110 or the OCR system 117 can be located on the recipient bank computer system 120. The OCR system 117 determines the characters and their locations by optical character recognition algorithms. In an example embodiment, the OCR system 117 may determine a level of certainty that a character has been correctly recognized. For example, if the level of certainty is above a first threshold (e.g., 70%), the character may be considered correctly recognized. If the level of certainty is below a first threshold (e.g., 50%), the character may be considered unrecognizable, and the user may be prompted to manually enter the character. If the level of certainty is between the first and second thresholds, the character may be considered uncertain, and the user may be prompted to confirm that the character was correctly recognized or to manually enter a different character.

The recipient bank computer system 120 includes account processing logic 122, account database 124, and network interface logic 127. The computer system 120 may be operated by a first banking entity that maintains and handles transaction processing for the recipient's accounts. The computer system 120 is configured to store information regarding the recipient's accounts. By way of example, information for a specific recipient account, designated by reference numeral 125, is shown as being stored in a database 124. As will be appreciated, database 124 may also store information regarding many other accounts (not shown).

The account 125 holds funds that are transmitted to the recipient upon receiving check deposit instructions from the recipient through the mobile device 110. Funds may flow into and out of the account 125. The recipient bank computer system 120 is connected to the source account bank computer system 130 through the network 160. Network interface logic 127 may include, for example, program logic that connects the computer system 120 to the network 160.

The recipient bank computer system 120 may receive requests to deposit funds from a mobile device 110 in the form of a check deposit request. The mobile check deposit system 140 may be part of a single or a distributed computer system that is part of the recipient bank computer system 120. The mobile check deposit system 140 includes an account identification logic 142, a risk assessment logic 144, a restricted endorsement request logic 146, a restricted endorsement assessment logic 148, and a check deposit logic 150. The check deposit request may include the amount of the funds to be deposited, the account into which the funds are to be deposited, and one or more images of the physical check(s) that were captured by a mobile device 110. The mobile check deposit system 140 is configured to determine the bank information (e.g. routing number, account number, check number) that is printed on the image of the check.

When the check deposit request is received (e.g., by computer system 120), the account identification logic 142 determines identifying information based on the check deposit request. In an exemplary embodiment, the check deposit request includes user-provided deposit information and an image of a front of the check to be deposited (i.e., a first check image). The identifying information may include information related to the account (e.g., account holder, account number, account history, date opened, etc.) and/or the deposit (e.g., deposit amount, check number, check date, payor, etc.). The account identification logic 142 includes an OCR system that determines the numbers and characters within the check image in order to determine identifying information related to the check deposit request.

The account identification logic 142 sends the identifying information to the risk assessment logic 144. The risk assessment logic 144 determines a risk level associated with the check deposit request based on the identifying information. The risk assessment logic 144 may also request and receive other account information from the account database 124 when the identifying information is received and use this information to determine the risk level. In an exemplary embodiment, the risk assessment logic 144 determines the risk level by requesting a risk assessment from an account verification service 170 (e.g., a credit agency, a network of financial institutions, etc.) based on the identifying information. The recipient bank computer system 120 is connected to the account verification service 170 by a network 180 or another similar network (e.g., network 160). The account verification service 170 includes network interface logic 174 for connecting the account verification service 170 to the network 180. The risk assessment logic 144 sends the identifying information to the account verification service 170 through the network 180 via the recipient bank computer system 120. The account verification service 170 determines the risk level (e.g., by risk assessment logic 172) and sends the risk level to the risk assessment logic 144. In this embodiment, the account verification service 170 utilizes the identifying information to obtain additional risk information associated with the account and/or the check. For instance, the risk level may include an overall risk of the account and/or the account holder, which may be based on prior transaction history, an account balance, a credit history, a prior history of fraud, and the like. The risk level may also include a risk associated with the check, which may be based on an amount of the check, whether the check has been involved in a prior fraud, a likelihood the check will be returned, and the like. The risk level may be binary (e.g., high or low, above or below a threshold, etc.) or the risk level may be based on a scale (e.g., from 0 to 1000).

When the risk assessment logic 144 determines that the risk level is at or below a specified risk threshold (e.g., low risk), the deposit may be accepted. In one embodiment, the identifying information is sent to the check deposit logic 150 and the check deposit logic 150 transmits the amount and any necessary account information to the financial institution to trigger a transfer of funds to the account 125 of the recipient (e.g., user, account holder, etc.). In another embodiment, the mobile check deposit system 140 requests and receives an image of the back of the check, such as by endorsement request logic, determines whether the requested image is acceptable, and then sends any necessary information to check deposit logic 150 for transferring the funds to account 125. When the risk assessment logic 144 determines that the risk level is above the specified risk threshold (e.g., high risk), however, the restricted endorsement request logic 146 may query the user to provide a restricted endorsement. The restricted endorsement request logic 146 sends a message (i.e., a restricted endorsement message) to the mobile device 110 requesting the restricted endorsement. The restricted endorsement request logic 146 may also indicate a reason for the request (e.g., excessive deposit amount, low account balance, etc.) within the restricted endorsement message. The restricted endorsement message instructs the user of the mobile device 110 to write the restricted endorsement in a specified area on the back of the check, capture an image of (i.e., photograph) the back of the check including the restricted endorsement, and submit the image (e.g., second check image) via the mobile device 110 (e.g., to the recipient bank computer system 120).

The restricted endorsement assessment logic 148 receives the second check image and determines a confidence level of the restricted endorsement based on the second check image. The restricted endorsement assessment logic 148 utilizes an OCR system that determines the characters of the restricted endorsement and their locations in the check that is being deposited using the mobile device 110. In one embodiment, the OCR system is OCR system 117. The OCR system can be an application stored on the mobile device 110 or the OCR system can be located on the recipient bank computer system 120. The OCR system determines the characters and their locations by optical character recognition algorithms.

The restricted endorsement assessment logic 148 determines a confidence level for the restricted endorsement, which may include whether the content of the restricted endorsement is sufficient and/or whether the restricted endorsement is contained within the specified area. The confidence level may be binary (e.g., high or low) or the confidence level may be determined on a scale (e.g., from 0 to 1000). In one embodiment, the restricted endorsement assessment logic 148 determines a level of certainty that a character within the restricted endorsement has been correctly recognized. For example, if the level of certainty is above a first threshold (e.g., 70%), the character may be considered correctly recognized. If the level of certainty is below a first threshold (e.g., 50%), the character may be considered unrecognizable. In this embodiment, the confidence level for the restricted endorsement may be based on a percentage of characters within the restricted endorsement that are recognizable.

In exemplary embodiments, the restricted endorsement assessment logic 148 requires the restricted endorsement to include a word or phrase, such as "FOR DEPOSIT ONLY," "FOR DEPOSIT ONLY TO X" where 'X' is the name of the financial institution, or "FOR DEPOSIT ONLY TO ACCOUNT X" where 'X' is the name of an account holder or an account number. In these embodiments, the restricted endorsement assessment logic 148 may determine the confidence level on the content of the restricted endorsement. In one embodiment, the restricted endorsement assessment logic 148 determines that the confidence level is high enough to deliver the funds only if the entire phrase is recognizable within the second check image. In another embodiment, the restricted endorsement assessment logic 148 determines that the confidence level is high enough to deliver the funds if a majority of the phrase is recognizable within the second check image. The restricted endorsement assessment logic 148 may also determine the confidence level based on a location of the restricted endorsement. For instance, the restricted endorsement assessment logic 148 may determine a lower confidence level if the restricted endorsement is not within the specified area, such as endorsement area 502 (see FIG. 4). The confidence level may also be based on any other requirements as may be suitable for the particular use of the system 100.

When the restricted endorsement assessment logic 148 determines the confidence level for the restricted endorsement is sufficient (e.g., high or greater than a specified confidence threshold), then identifying information is sent to the check deposit logic 150 for transmitting the amount and any necessary account information to the financial institution to trigger the transfer of funds to the account 125 of the user. When the restricted endorsement logic 148 determines the confidence level for the restricted endorsement is not sufficient (e.g., low, at or below the specified confidence threshold, etc.), then the restricted endorsement request logic 146 either sends an additional restricted endorsement message or the mobile check deposit system does not accept the check deposit request.

The source account computer system 130 includes account processing logic 132, accounts database 134, and network interface logic 137. The bank account logic 139 may be operated by a second banking entity that maintains and handles transaction processing for source accounts. The database 134 may store information for a source account, designated by reference numeral 135 in FIG. 1. The source account 135 may be a demand deposit account held by a user with another financial institution that wrote a check to the recipient. Although in the illustrated embodiment the computer systems 120 and 130 are shown as being separate and as communicating through a network 160, it will be appreciated that the computer systems 120 and 130 may also be integrated in a single payment processing system (e.g., if the two financial institutions are the same).

Figure 2:
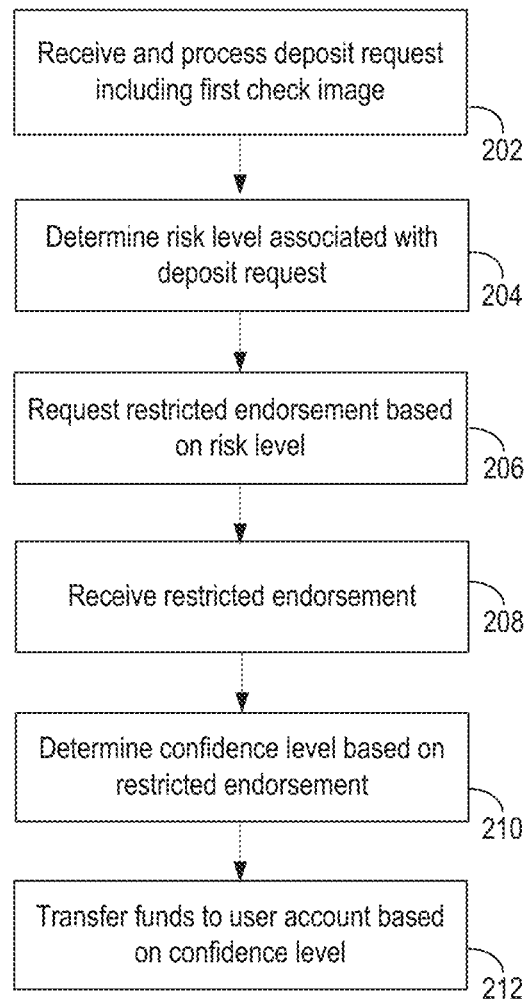
FIG. 2 is an illustration of a process for receiving a check deposit request, according to an exemplary embodiment.

Referring now to FIG. 2, flow chart 200 illustrates a process for depositing a check using the check processing system 100, according to an exemplary embodiment. At 202, a check deposit request is received (e.g., by the recipient bank computer system 120) for funds to be deposited into the account 125. In an exemplary embodiment, the check deposit request includes the first check image. For example, the user may use the mobile device 110 to capture an image of the front of a check (e.g., the first check image) and send it to the recipient bank computer system 120 as part of the check deposit request. At 204, a risk level is determined for the check deposit request. The risk level is determined by the risk assessment logic 144. The risk level may be determined based on the associated account and/or the check being deposited. In an exemplary embodiment, the risk level is determined based on a risk assessment performed by the account verification service 170. At 206, a restricted endorsement is requested based on the risk level. In an exemplary embodiment, the restricted endorsement is requested if the risk level is above a specified risk level threshold. The user is required to write the restricted endorsement on the back of the check and within a specified area (e.g., the endorsement area 502). At 208, the restricted endorsement is received (e.g., by the recipient bank computer system 120). At 210, a confidence level is determined based on the restricted endorsement. At 212, funds are transferred to a user account based on the confidence level. In an exemplary embodiment, the funds are transferred to the user account if the confidence level is above a specified confidence level threshold.

Figure 3:
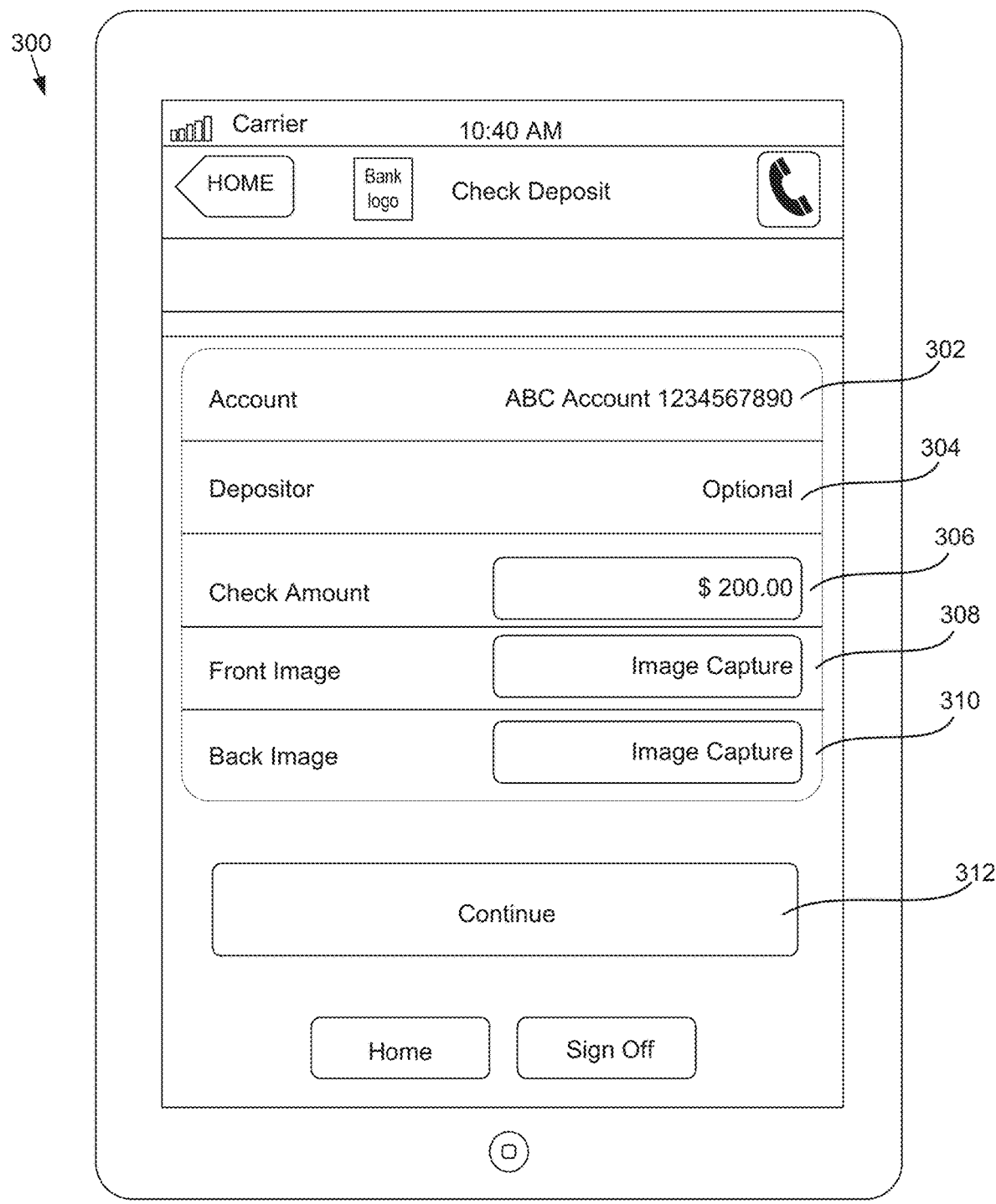
FIG. 3 is screen view of a mobile device implementing the check processing system of FIG. 1, according to an exemplary embodiment.
Figure 4:
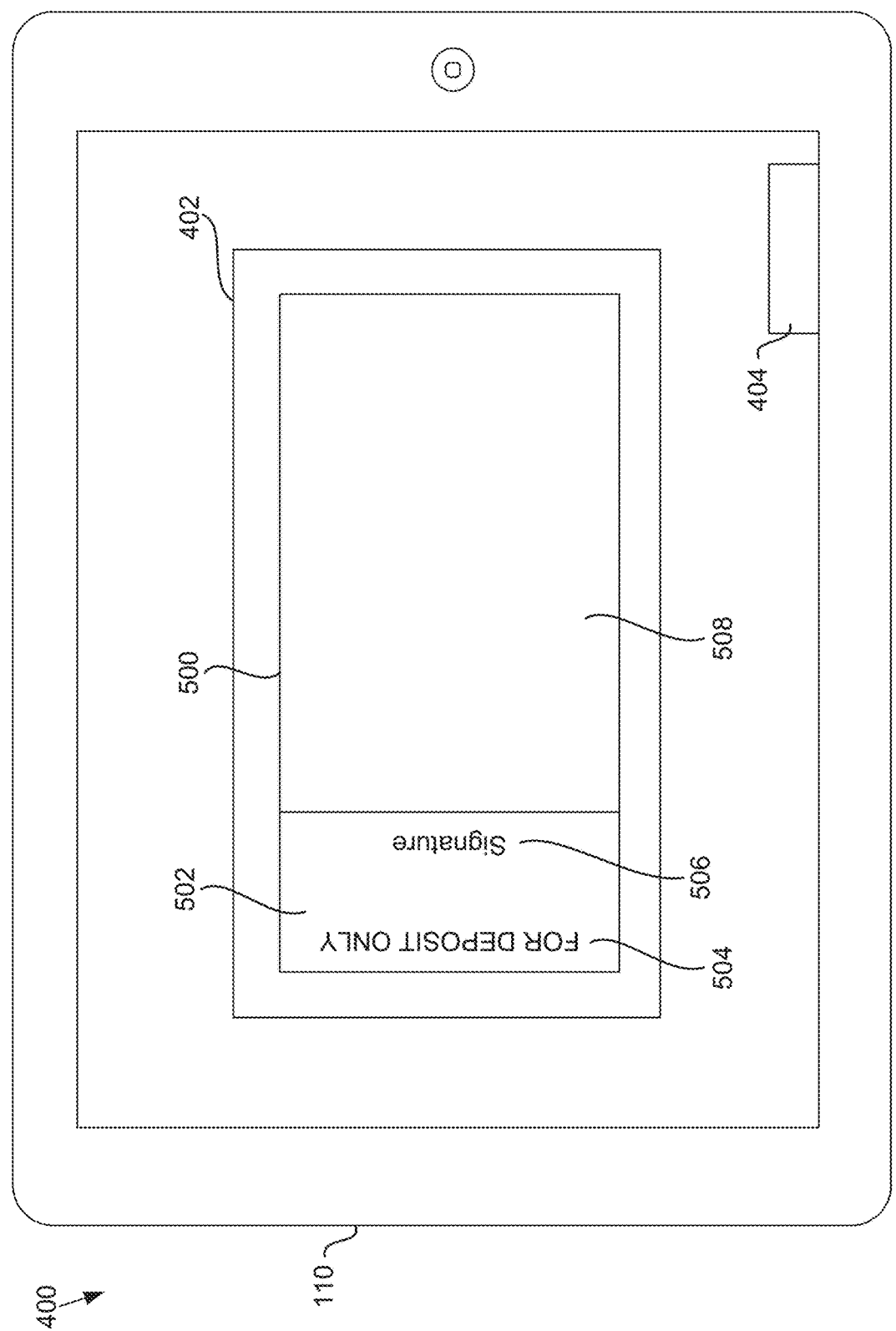
FIG. 4 is a screen view of the mobile device capturing an image of the back of the check, according to an exemplary embodiment.

Referring now to FIG. 3, an example screen 300 is shown on mobile device 110 to initiate a mobile check deposit. The user may choose from one or more accounts 302 to receive the funds from the check deposit. In the example shown, the user chooses to deposit funds to an account 302 ("ABC Account 1234567890"). Accordingly, account 302 corresponds to the user account 125 described above in connection with FIG. 1. As shown in screen 300, the depositor 304 is an optional field that may be filled out by the user. In order to deposit a check the user may enter a check amount 306. The user may navigate menu selections to upload one or more images of the check at front image and back image menu items. When a user selects an image capture button 308, a screen as shown in FIG. 4 may be displayed to facilitate capturing an image of a front of the check (i.e., the first check image). When a user chooses to select an image capture button 310, a screen as shown in FIG. 4 may be displayed to facilitate capturing an image of a back of the check (i.e., the second check image). In an exemplary embodiment, continue button 312 is selectable once the user provides input for the account 302, check amount 306, and image capture button 308 to send the check deposit request. In this embodiment, the image capture button 310 is not selectable until the user provides input for the account 302, check amount 306, image capture button 308, and presses the continue button 312. The continue button 312 may also be selectable once the user provides input for the account 302, check amount 306, and image capture buttons 308 and 310.

Referring to FIG. 4, a screen shot 400 for capturing an image of the back of a check 500 is shown, according to an exemplary embodiment. The screen in FIG. 4 displays a rectangular guide box 402 that is overlaid over the image that is being captured by the image capture device 116. In some embodiments, instructions may be provided within the guide box 402 for instructing the user regarding how to capture the back of the check 500. In one embodiment, the lines at the edge of the guide box 402 may be colored red until the back of the check is detected by the image capture device 116. Upon detecting that a check is within the lines of the guide box 402, the color of the guidelines may change to green from red to provide visual feedback to the user to press the camera button 404. Pressing the camera button 404 activates the digital shutter mechanism and an image is stored in the memory of the mobile device 110.

The check 500 is also shown in FIG. 4. The check 500 includes an endorsement area 502 and an area 508. Within the endorsement area 502 is a restricted endorsement 504. In this embodiment, the restricted endorsement 504 includes the text "FOR DEPOSIT ONLY" and is in capital letters. In other embodiments, the restricted endorsement may include other words or phrases, as described above. A signature 506 is also included within the endorsement area 502.

The embodiments of the mobile check deposit are described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

The invention claimed is:

1. A method implemented by a mobile device, the method comprising:
    initiating an image sensor of the mobile device to detect imagery via one or more lenses of the image sensor;
    displaying, on a display screen of the mobile device, the imagery detected by the image sensor;
    overlaying, on the displayed imagery, a guide box having edges of a first color;
    detecting, by the image sensor and within the guide box, a check within the imagery;
    responsive to detecting the check within the guide box, (i) changing the edges of the guide box to a second color to indicate that the check is detected, (ii) capturing a check image using the image sensor of the mobile device, and (iii) storing the check image in a memory of the mobile device;
    applying an optical character recognition (OCR) algorithm to the check image to detect a presence of one or more characters within the check image and positions of the one or more characters in the check image;
    determining a certainty score for each of the one or more characters within the check image;
    assigning a respective tag to each of a subset of the one or more characters that have a certainty score above a first certainty threshold;
    determining, based at least in part on the respective tag of each of the subset of the one or more characters, a confidence level for a restricted endorsement in the check image, the confidence level corresponding to (i) whether the positions of the subset of the one or more characters of the restricted endorsement are within a predetermined area of the check image and (ii) the subset of the one or more characters of the restricted endorsement form a predetermined word or phrase; and
    transmitting, responsive to the confidence level satisfying a predetermined threshold, the check image to a check processing computer system, causing the check processing computer system to automatically deposit funds based on the restricted endorsement.

2. The method of claim 1, wherein the confidence level is determined based on a percentage of recognizable characters within the restricted endorsement.

3. The method of claim 1, further comprising determining that the restricted endorsement is within a specified area in the check image in response to determining that the confidence level is above a confidence threshold.

4. The method of claim 1, further comprising:
assigning a second tag to a character of the one or more characters having the certainty score between the first certainty threshold and a second certainty threshold, wherein the second certainty threshold is lower than the first certainty threshold;
displaying, on the display screen of the mobile device, a request to validate the character having the second tag;
responsive to the request to validate the character having the second tag, receiving, by the mobile device, validated characters corresponding to the character having the second tag; and
revising the confidence level for the restricted endorsement based on the character having a first tag and the second tag.

5. The method of claim 4, further comprising:
assigning a third tag to a character having the certainty score below the second certainty threshold, displaying, on the display screen of the mobile device, a request to enter the character having the third tag;
responsive to the request to enter the character having the third tag, receiving entered characters corresponding to the character having the third tag; and
revising the confidence level for the restricted endorsement based on the character having the first tag, the second tag, and the third tag.

6. The method of claim 1, further comprising displaying, on the display screen of the mobile device, the check image.

7. The method of claim 1, further comprising displaying, on the display screen on a first side of the mobile device, the check image detected by the image sensor disposed on the first side of the mobile device.

8. The method of claim 1, further comprising displaying, on the display screen on a first side of the mobile device, the check image detected by the image sensor disposed on a second side of the mobile device, the first side disposed opposing the second side on the mobile device.

9. The method of claim 1, further comprising transmitting an amount associated with the check image to an institution to trigger a transfer of funds into a user account, the funds equal to the amount.

10. The method of claim 1, further comprising transmitting, responsive to the confidence level satisfying a specified confidence threshold, an amount associated with the check image to an institution to trigger a transfer of funds into a user account, the funds equal to the amount.

11. A computer system comprising:
a mobile device comprising an image sensor configured to detect imagery via one or more lenses of the image sensor, the mobile device comprising a processor coupled to a memory, wherein the processor is configured to:
display, on a display screen of the mobile device, the imagery detected by the image sensor;
overlay, on the displayed imagery, a guide box having edges of a first color;
detect, by the image sensor and within the guide box, a check within the imagery;
responsive to detecting the check within the guide box, (i) change the edges of the guide box to a second color to indicate that the check is detected, (ii) capture a check image using the image sensor of the mobile device, and (iii) store the check image in the memory of the mobile device;
apply an optical character recognition (OCR) algorithm to the check image to detect a presence of one or more characters within the check image and positions of the one or more characters in the check image;
determine a certainty score for each of the one or more characters within the check image;
assign a respective tag to each of a subset of the one or more characters that have a determined certainty score above a first certainty threshold;
determine, based at least in part on the respective tag of each of the subset of the one or more characters, a confidence level for a restricted endorsement in the check image, the confidence level corresponding to (i) whether the positions of the subset of the one or more characters of the restricted endorsement are within a predetermined area of the check image and (ii) the subset of the one or more characters of the restricted endorsement form a predetermined word or phrase; and
transmitting, responsive to the confidence level satisfying a predetermined threshold, the check image to a check processing computer system, causing the check processing computer system to automatically deposit funds based on the restricted endorsement.

12. The computer system of claim 11, wherein the confidence level is determined based on a percentage of recognizable characters within the restricted endorsement.

13. The computer system of claim 11, wherein the processor is further configured to determine that the restricted endorsement is within a specified area in the check image in response to determining that the confidence level is above a confidence threshold.

14. The computer system of claim 11, wherein the processor is further configured to:
assign a second tag to a character of the one or more characters having the certainty score between the first certainty threshold and a second certainty threshold, wherein the second certainty threshold is lower than the first certainty threshold;
display, on the display screen of the mobile device, a request to validate the character having the second tag;
responsive to the request to validate the character having the second tag, receive validated characters corresponding to the character having the second tag; and
revise the confidence level for the restricted endorsement based on the character having a first tag and the second tag.

15. The computer system of claim 14, wherein the processor is further configured to:
assign a third tag to a character having the certainty score below the second certainty threshold, display, on the display screen of the mobile device, a request to enter the character having the third tag;
responsive to the request to enter the character having the third tag, receive entered characters corresponding to the character having the third tag; and
revise the confidence level for the restricted endorsement based on the character having the first tag, the second tag, and the third tag.

16. The computer system of claim 11, wherein the processor is further configured to display, on the display screen on a first side of the mobile device, the check image detected by the image sensor disposed on the first side of the mobile device.

17. The computer system of claim 11, wherein the processor is further configured to display, on the display screen on a first side of the mobile device, the check image detected by the image sensor disposed on a second side of the mobile device, the first side disposed opposing the second side on the mobile device.

18. The computer system of claim 11, wherein the processor is further configured to transmit an amount associated with the check image to an institution to trigger a transfer of funds into a user account, the funds equal to the amount.

19. The computer system of claim 11, wherein the processor is further configured to transmit, responsive to the confidence level satisfying a specified confidence threshold, an amount associated with the check image to an institution to trigger a transfer of funds into a user account, the funds equal to the amount.

20. A non-transitory computer-readable storage medium that stores one or more programs configured to be executed by one or more processors of a mobile device, the one or more programs including instructions for:

initiating an image sensor of the mobile device to detect imagery via one or more lenses of the image sensor;

displaying, on a display screen of the mobile device, the imagery detected by the image sensor;

overlaying, on the displayed imagery, a guide box having edges of a first color;

detecting, by the image sensor and within the guide box, a check within the imagery; responsive to detecting the check within the guide box, (i) changing the edges of the guide box to a second color to indicate that the check is detected, (ii) capturing a check image using the image sensor of the mobile device, and (iii) storing the check image in a memory of the mobile device;

applying an optical character recognition (OCR) algorithm to the check image to detect a presence of one or more characters within the check image and positions of the one or more characters in the check image;

determining a certainty score for each of the one or more characters within the check image;

assigning a respective tag to each of a subset of the one or more characters that have a certainty score above a first certainty threshold;

determining, based at least in part on the respective tag of each of the subset of the one or more characters, a confidence level for a restricted endorsement in the check image, the confidence level corresponding to (i) whether the positions of the subset of the one or more characters of the restricted endorsement are within a predetermined area of the check image and (ii) the subset of the one or more characters of the restricted endorsement form a predetermined word or phrase; and transmitting, responsive to the confidence level satisfying a predetermined threshold, the check image to a check processing computer system, causing the check processing computer system to automatically deposit funds based on the restricted endorsement.

* * * * *